United States Patent
Ward et al.

(10) Patent No.: US 9,156,429 B2
(45) Date of Patent: Oct. 13, 2015

(54) CURTAIN AIRBAG WITH SEAT ENGAGING FEATURE

(71) Applicant: FORD GLOBAL TECHNOLOGIES, LLC, Dearborn, MI (US)

(72) Inventors: Marcus John Scott Ward, Billericay Essex (GB); Barry Grindle, Saffron Walden (GB); Ian Derbyshire, Sible Hedingham Halstead Essex (GB); Michal Jan Swiniarski, Warley Brentwood Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/528,779

(22) Filed: Oct. 30, 2014

(65) Prior Publication Data

US 2015/0158451 A1     Jun. 11, 2015

(30) Foreign Application Priority Data

Oct. 30, 2013   (GB) .................................. 1319156.4

(51) Int. Cl.
*B60R 21/232*   (2011.01)
*B60N 2/44*     (2006.01)
*B60R 21/214*   (2011.01)
(Continued)

(52) U.S. Cl.
CPC ............... *B60R 21/232* (2013.01); *B60N 2/44* (2013.01); *B60R 21/214* (2013.01); *B60R 21/235* (2013.01); *B60R 21/23138* (2013.01); *B60R 2021/23576* (2013.01)

(58) Field of Classification Search
CPC ............... B60R 21/232; B60R 21/214; B60R 21/23138; B60R 21/235; B60N 2/44
See application file for complete search history.

(56) References Cited

U.S. PATENT DOCUMENTS

| 5,636,862 | A  | * | 6/1997 | Cheung et al. | ............. | 280/730.2 |
| 7,967,332 | B2 | * | 6/2011 | Karlsson | ..................... | 280/730.2 |
| 8,469,395 | B2 | * | 6/2013 | Richez et al. | ............. | 280/730.2 |

(Continued)

FOREIGN PATENT DOCUMENTS

| GB | 2482394 A | 2/2012 |
| JP | H061198 A | 1/1994 |
| JP | 2011111067 A | 6/2011 |

OTHER PUBLICATIONS

Intellectual Property Office, Search Report for the corresponding Great Britain Patent Application No. GB1319156.4 mailed May 14, 2014.

(Continued)

*Primary Examiner* — Faye M Fleming
(74) *Attorney, Agent, or Firm* — Frank A. MacKenzie; Brooks Kushman P.C.

(57) ABSTRACT

A curtain airbag assembly for a vehicle has an airbag with a receiving portion shaped to clamp onto or around a portion of a seat of the vehicle when the airbag is deployed to assist in securing the airbag in place. The receiving portion is formed by supplementary material adjacent to a seam between inner and outer panels of the airbag, the supplementary material forming a clamping pocket which grips an outboard portion of the seat upon inflation of the airbag. Alternatively, the receiving portion is formed by first and second overlapping portions of the airbag which overlap one another when the airbag is deflated, the overlapping portions forming a clamping pocket configured to grip the outboard portion of the seat upon inflation of the airbag.

14 Claims, 5 Drawing Sheets

(51) Int. Cl.
*B60R 21/231* (2011.01)
*B60R 21/235* (2006.01)

(56) References Cited

U.S. PATENT DOCUMENTS

| | | | |
|---|---|---|---|
| 8,991,858 | B2 | 3/2015 | Rick |
| 2002/0171233 | A1* | 11/2002 | Grace ........................ 280/733 |
| 2004/0075255 | A1* | 4/2004 | Honda et al. ............. 280/730.2 |
| 2006/0012155 | A1* | 1/2006 | Shaner et al. ............. 280/730.2 |
| 2006/0119082 | A1* | 6/2006 | Peng et al. ................ 280/730.2 |
| 2007/0126213 | A1* | 6/2007 | Korechika ................ 280/730.2 |

OTHER PUBLICATIONS

European Patent Office, Extended Search Report for the corresponding European Patent Application No. 14183677.5 mailed Mar. 2, 2015.

* cited by examiner

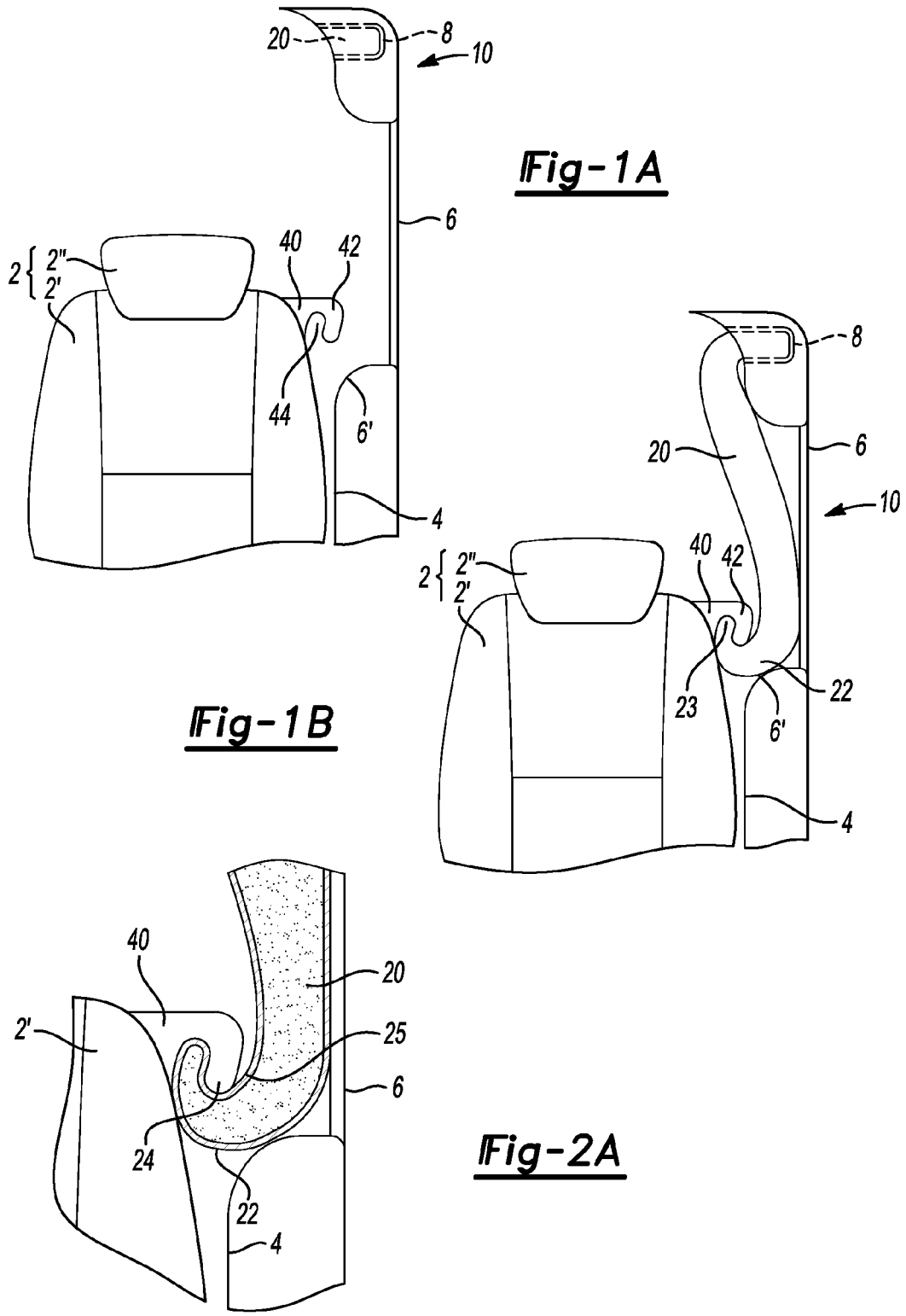

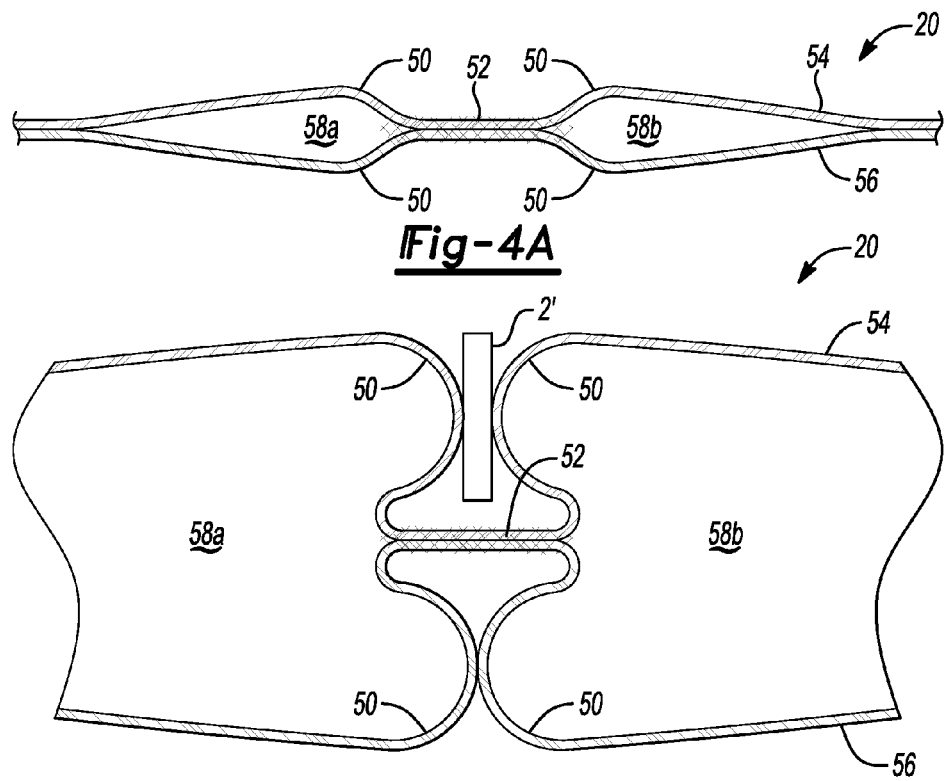
Fig-4A
Fig-4B
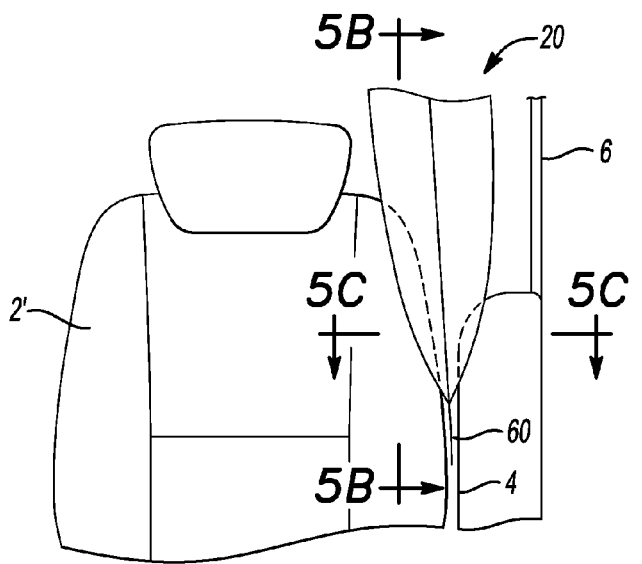
Fig-5A

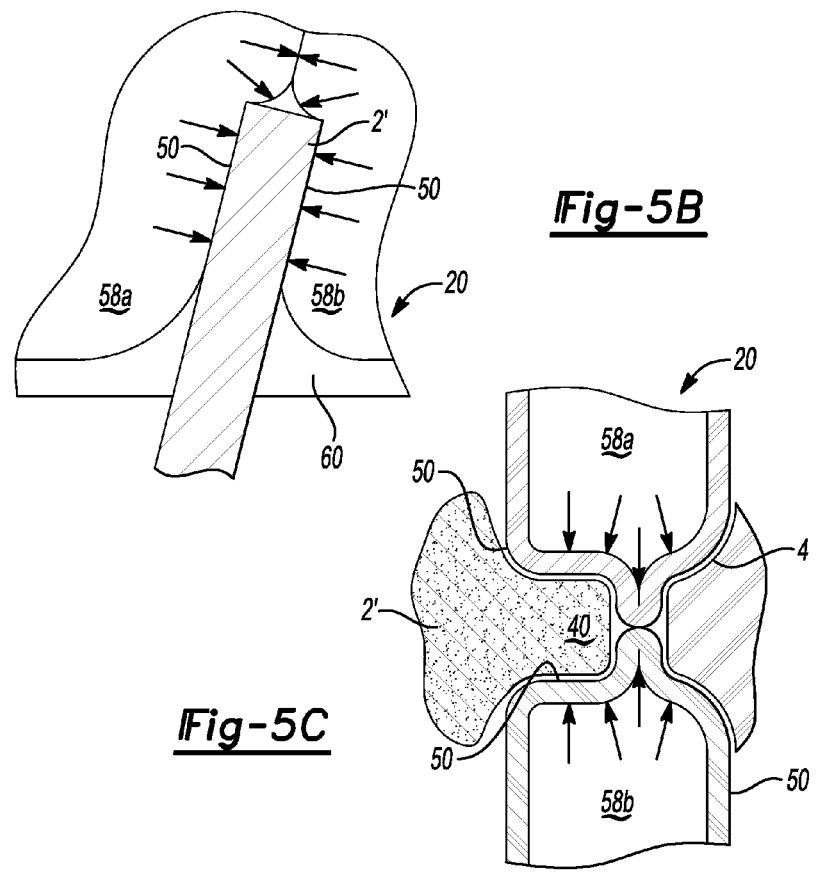
*Fig-5B*
*Fig-5C*
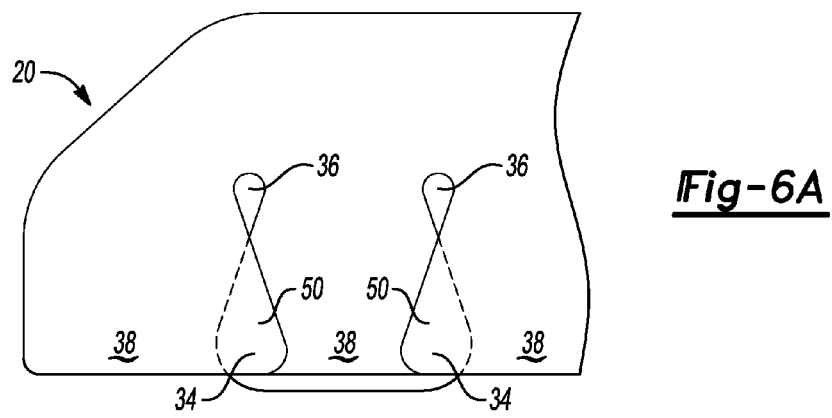
*Fig-6A*

CURTAIN AIRBAG WITH SEAT ENGAGING FEATURE

CROSS-REFERENCE TO RELATED APPLICATIONS

This application claims foreign priority benefits under 35 U.S.C. §119(a)-(d) to GB 1319156.4 filed Oct. 30, 2013, which is hereby incorporated by reference in its entirety

TECHNICAL FIELD

The present disclosure relates to a curtain airbag assembly and in particular to an improved curtain airbag assembly for a motor vehicle.

BACKGROUND

It is known to provide a motor vehicle with a curtain airbag to protect an occupant of a motor vehicle from contact with a side of the motor vehicle during an accident and to prevent a body part of an occupant from passing through a window aperture during a roll-over event.

It is further known to provide two airbags arranged in a side by side relationship each of the airbags having a straight edge that, when the airbags are deployed, forms a vertical edge that abuts the corresponding vertical edge of the adjacent airbag. The location of the join between the two airbags is normally located in front of a vertical window frame member, such as a B-post or C-post, and the join is often held together by tethers.

In such curtain airbag arrangements it is possible that, when forces are applied to the two airbags by the impact of one or more occupants, the two vertical edges may separate unless there are many tethers holding the two airbags in place, and the tethers hold the two airbags tightly together which is technically difficult to achieve. Any such airbag separation risks exposure of the underlying structural member which is clearly not desirable. It is further possible with such an arrangement that, if the forces applied to one airbag are considerably larger than those applied to the other airbag, the other airbag can be dragged across potentially causing the one airbag to move into an unstable position thereby reducing its effectiveness particularly in respect of extrusion of the airbag through an adjacent window aperture.

The present disclosure seeks to address these issues.

SUMMARY

According to a first aspect of the present disclosure there is provided a curtain airbag assembly for a vehicle, such as a motor vehicle, the curtain airbag assembly having one or more airbags, wherein the airbags comprise one or more shaped portions that are shaped to complement, e.g. engage, at least an engaging portion of a seat of the vehicle when the airbag is deployed, e.g. inflated. The shaped portions may be configured such that when the airbag is deployed the shaped portions engage the engaging portion of the seat to assist in securing the airbag in place.

The shaped portions may form a receiving portion when the airbag is deployed. The receiving portion may be configured to receive the seat engaging portion.

The shaped portions may form an opening in a surface of the airbag. The opening may be configured to engage the engaging portion of the seat when the airbag is deployed. The opening may extend from a first side of the airbag to a second side of the airbag. The opening may extend partially from a first side of the airbag to a second side of the airbag. The opening may have one or more sidewalls to ensure that the airbag remains substantially airtight.

The shaped portions may be shaped in a pre-deployed state. The airbags may comprise one or more panels. The panels may be shaped so as to form the one or more shaped portions.

The shaped portions may be configured to engage a hook portion provided on the seat, e.g. on the seat back. The curtain airbag assembly may comprise the engaging portion of the seat. The curtain airbag assembly may comprise the hook portion.

One or more of the airbags may comprise supplementary material in at least a region of the airbag that may be adjacent to the seat when the airbag is deployed. One or more layers of the airbags may comprise the supplementary material. The supplementary material may be configured such that the supplementary material may clamp the seat when the airbag is deployed.

One or more of the airbags may comprise overlapping portions that overlap when the airbag is deflated. The overlapping portions may form the shaped portions. The overlapping portions may be configured to clamp the seat when the airbag is deployed. The shaped portions may be configured to engage a back of the seat.

The shaped portions may be provided at or towards a bottom end of the airbag when deployed.

According to a second aspect of the present disclosure there is provided an engaging portion for a seat of a vehicle, the engaging portion being configured to complement one or more shaped portions of an airbag when the airbag is deployed, the engaging portion being configured such that when the airbag is deployed the engaging portion engages the shaped portions to assist in securing the airbag in place. A seat for a vehicle may comprise the engaging portion configured to complement one or more shaped portions of an airbag. The engaging portion may comprise a hook portion configured to engage an opening formed by the one or more shaped portions. The engaging portion may be configured to engage the above-mentioned curtain airbag assembly.

A vehicle may comprise the above-mentioned curtain airbag assembly. A vehicle may comprise the above-mentioned engaging portion.

According to a third aspect of the present disclosure there is provided a method of deploying a curtain airbag assembly for a vehicle, the curtain airbag assembly having one or more airbags, wherein the airbags comprise one or more shaped portions that are shaped to complement at least an engaging portion of a seat of the vehicle when the airbag is deployed, the method comprising deploying the airbag and engaging the engaging portion of the seat with the shaped portions to assist in securing the airbag in place.

For a better understanding of the present disclosure, and to show more clearly how it may be carried into effect, reference will now be made, by way of example, to the accompanying drawings, in which:

BRIEF DESCRIPTION OF THE DRAWINGS

FIGS. 1A and 1B show front views of a curtain airbag assembly according to a first example of the present disclosure in which FIG. 1A shows the curtain airbag assembly in a pre-deployed state and FIG. 1B shows the curtain airbag assembly in a deployed state;

FIG. 2A shows a sectional front view of the curtain airbag assembly in a deployed state according to the first example of the present disclosure;

FIGS. 4A and 4B show top views of the curtain airbag assembly according to a third example of the present disclosure in a pre-deployed and deployed state respectively;

FIGS. 5A, 5B and 5C show side, back (section 5B-5B) and top (section 5C-5C) views of the curtain airbag assembly according to the third example of the present disclosure in a deployed state respectively; and FIGS. 6A, 6B, 6C and 6D show side views (FIGS. 6A and 6C) and bottom views (FIGS. 6B and 6D) of the curtain airbag assembly according to a fourth example of the present disclosure in an unfolded but pre-inflation state (FIGS. 6A and 6B) and an inflated state (FIGS. 6C and 6D)

DETAILED DESCRIPTION

Figure 2B:
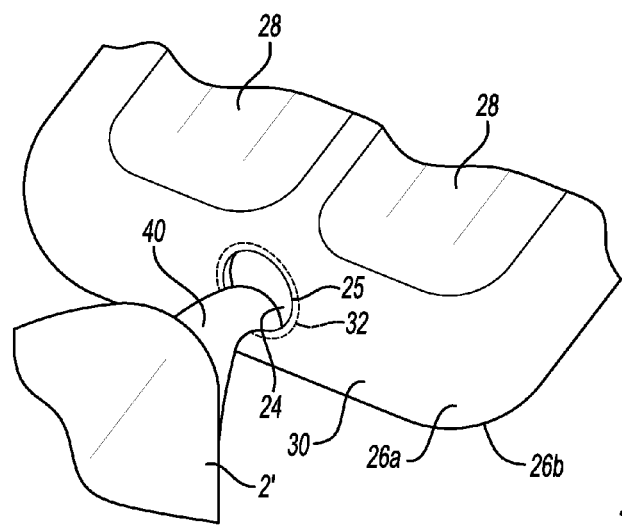
FIG. 2B shows a perspective view of the curtain airbag assembly in a deployed state according to a second example of the present disclosure.

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1A and 1B, the present disclosure relates to a curtain airbag assembly 10 for a vehicle, such as a motor vehicle. The curtain airbag assembly 10 has one or more airbags 20. As such, the one or more airbags 20 may form a side air curtain, which is provided between a seat 2 and a side trim 4 of the vehicle. FIG. 1A shows the curtain airbag assembly 10 in a pre-deployed state with the airbags concealed (deflated and stowed) in a compartment 8. The compartment 8 may be provided at an upper end of the trim 4, e.g. adjacent to an upper sill above a window 6. By contrast, FIG. 1B shows the curtain airbag assembly 10 in a deployed state with the airbags inflated and extending downward to substantially overlie the window 6, thereby protecting occupants from side impact and preventing egress through the window. The airbag 20 may be activated and expelled, e.g. inflated, from the compartment 8 in a conventional manner.

The airbags 20 comprise one or more shaped portions 22 that are shaped to complement, e.g. engage, at least an engaging portion 40 of the seat 2 when the airbag is deployed. The shaped portions 22 may be configured such that when the airbag 20 is deployed the shaped portions 22 engage the engaging portion 40 of the seat 2 to assist in securing the airbag in place.

There may be one airbag 20 per seat 2. Each airbag 20 may comprise one or more shaped portions 22 for engaging with the engaging portion 40. Alternatively, a single airbag 20 may be provided for a plurality of seats 2, e.g. where the seats are arranged one behind the other. In the case of a single airbag being provided for a plurality of seats, the airbag may be provided with a plurality of shaped portions 22, with at least one shaped portion for each seat. In either case, the airbags 20 may extend across one or more windows 6.

As depicted in FIG. 1B, the shaped portions 22 may form a receiving portion when the airbag 20 is deployed. The receiving portion may be configured to receive the seat engaging portion 40. By way of example, the engaging portion 40 may be in the form of a hook 42 and the airbag shaped portions 22 may be shaped to conform to the engaging portion hook 42. The shaped portions 22 of the airbag may comprise an upward extending portion 23 when the airbag is deployed. The hook 42 may be received between the upward extending portion 23 and the remainder of the airbag 20. Similarly, the upward extending portion 23 may be received in a recess 44 defined by the hook 42. The shaped portions 22 and engaging portion 40 may interlock when the airbag is deployed so that the airbag is held in place over the window 6 and egress of an occupant through the window is prevented.

The shaped portions 22 may be provided at or towards a bottom end of the airbag 20 when deployed. Similarly, the shaped portions 22 may be provided on an inboard-facing side of the airbag, e.g. a side of the airbag that faces away from the window 6 and towards the seat 2, when the airbag is deployed.

The curtain airbag assembly 10 or the seat 2 may comprise the engaging portion 40. The engaging portion 40 may be provided at or towards the top of a back rest 2' of the seat 2. (The seat 2 may also comprise a head rest 2".) The engaging portion 40 may be provided at a location above a sill 6' associated with the window 6. The engaging portion 40 may extend from one side of the seat 2, in particular on a side of the seat facing the adjacent window 6. Accordingly, the engaging portion 40 may extend in the direction of the window 6. The engaging portion 40 may also extend in a direction with a component in the upwards direction.

The engaging portion 40 may be mounted on a seat belt guide associated with the seat 2. The engaging portion 40 may be integral with the seat belt guide.

It will be appreciated that the shaped portions 22 in the deployed state may be enabled by the shape of the airbag 20 in the pre-deployed state. For example, the material forming the airbag may be shaped in the pre-deployed state so as to form the shaped portions 22 when deployed. In particular, the airbags 20 may comprise one or more panels or layers of material. The panels may be shaped so as to form the one or more shaped portions 22. The panels of material may be joined together, e.g. by one or more seams. The location of the joins may assist in forming the shaped portions in the deployed state.

When the airbag 20 is deployed, the airbag may unfurl along the window 6 and a lower end of the airbag may be guided by the trim 4, e.g. the window sill 6', towards the engaging portion 40. In other words, the airbag 20 may unwrap along the window 6 and trim 4 so as to deliver the shaped portion 22 to the engaging portion 40. The trim 4 may be shaped to aid the unfurling of the airbag 20 towards the engaging portion 40. The shaped portions 22 may then engage the engaging portion 40 to assist in securing the airbag 20 in place.

With reference to FIGS. 2A and 2B, the one or more shaped portions 22 may form an opening 24 in a surface of the airbag and the opening 24 may be configured to engage the engaging portion 40 when the airbag 20 is deployed. As depicted in FIG. 2A, in a first example of the present disclosure, the opening 24 may extend partially from a first side 26a of the airbag to a second side 26b of the airbag. In other words, the opening 24 may not extend completely through the airbag to the second side 26b. The opening 24 may or may not extend across the full width of the airbag, e.g. in the fore-aft direction.

However, as depicted in FIG. 2B, in a second example of the present disclosure, the opening 24 may extend from the first side 26a of the airbag to the second side 26b of the airbag, e.g. completely through the thickness of the airbag. In either the first or second example, the opening 24 may have one or more sidewalls 25 to ensure that the airbag 20 remains substantially airtight.

As is shown in FIG. 2B, the opening 24 may be provided in a substantially tubular portion 30 of the airbag 20. The airbag 20 may comprise one or more head protection chambers 28. The tubular portion 30 may surround the head protection chambers 28. Reinforcements, such as reinforcing stitching 32, may be provided around the opening 24 to ensure the structural integrity of the opening 24 and/or to ensure that the airbag 20 remains substantially airtight.

With reference to FIGS. 4 and 5, in a third example of the present disclosure, the one or more airbags 20 may comprise supplementary material 50 in at least a region of the airbag adjacent to the seat 2 when the airbag is deployed. The supplementary material 50 may be configured such that the supplementary material may clamp onto or around a portion of the seat 2 when the airbag 20 is deployed. The supplementary material 50 may form the one or more shaped portions 22.

Figure 3A:
FIGS. 3A and 3B show top views of a previously-proposed curtain airbag assembly in a pre-deployed and deployed state respectively.
Figure 3B:
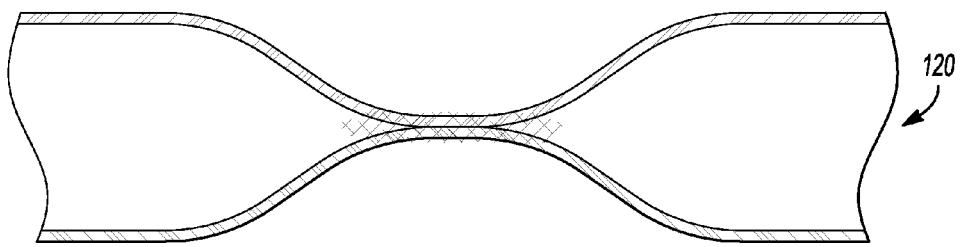

FIG. 3 shows a previously proposed airbag arrangement 120 and this is contrasted by FIG. 4, which shows an airbag arrangement according to the third example of the present disclosure with the supplementary material 50. (FIGS. 3A and 3B show the previously-proposed curtain airbag arrangement 120 in a pre-deployed and deployed state respectively and FIGS. 4A and 4B show the airbag arrangement according to the third example of the present disclosure in the pre-deployed and deployed states respectively.)

The supplementary material 50 may be provided in a region of the airbag that is adjacent to the seat 2 when deployed. The supplementary material 50 may be provided adjacent to a join 52 in the airbag 20. The join 52 may be between first and second layers 54, 56 forming the airbag 20. The join 52 may be provided between neighboring chambers 58a, 58b configured for receiving gas during deployment of the airbag. The join 52 may be elongate and may be orientated in a direction that substantially follows an edge of the seat back 2' when the airbag is deployed. The join 52 between the first and second layers 54, 56 is an area, line, or zone of reduced thickness between and relative to the two portions or chambers or either side of the join, and may be formed by weaving, stitching, cross-tethering or any other joining technique.

The supplementary material 50 may be continuous with the surrounding material of the airbag, e.g. the supplementary material and the surrounding material may be unitary. One or both layers 54, 56 of the airbags may comprise the supplementary material 50. However, the layer 54 adjacent to the seat 2 may be provided with the supplementary material 50. The layer 56 adjacent to the trim 4 may also be provided with the supplementary material 50. The supplementary material 50 may also be provided either side of the join 52, e.g. fore or aft of the join in the deployed state. However, as depicted the supplementary material 50 may be provided on both sides of the join 52. As depicted in FIG. 4B, the supplementary material 50 forms a clamping pocket which grips or clamps onto and around a portion of the seat back 2' when the airbag 20 is inflated. By contrast, as shown in FIG. 3B, the lack of any supplementary material with the previously-proposed airbag arrangement does not permit the seat to be clamped by the airbag 120.

FIGS. 5A-5C show further views of the airbag 20 according to the third example in a deployed state. As is depicted, the supplementary material 50 increases the space in which the airbag 20 expands into and permits the airbag clamping pocket to clamp around the seat back 2'. It will be appreciated that the supplementary material 50 may form the shaped portions 22 of the airbag. Furthermore, the engaging portion 40 which is gripped by the clamping pocket may be a portion of the seat 2, e.g. a portion of the seat back 2'.

As shown in FIGS. 5A and 5B, the airbag 20 may comprise a web or sail 60. The sail 60 may comprise a layer of material that is not inflatable. The sail 60 may be provided between and/or below chambers 58a, 58b. The sail 60 may help to retain the structure of the airbag 20 when deployed.

Figure 6B:
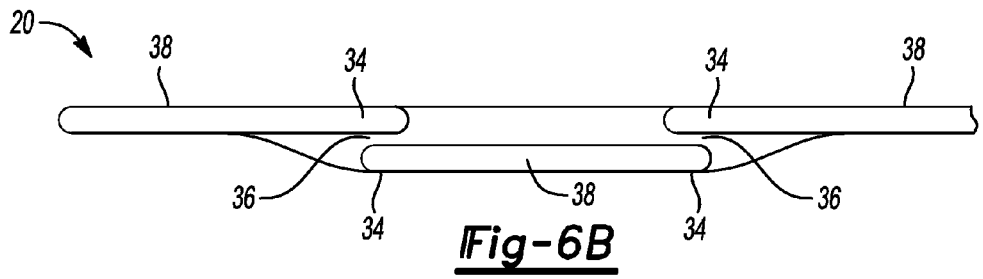
Figure 6C:
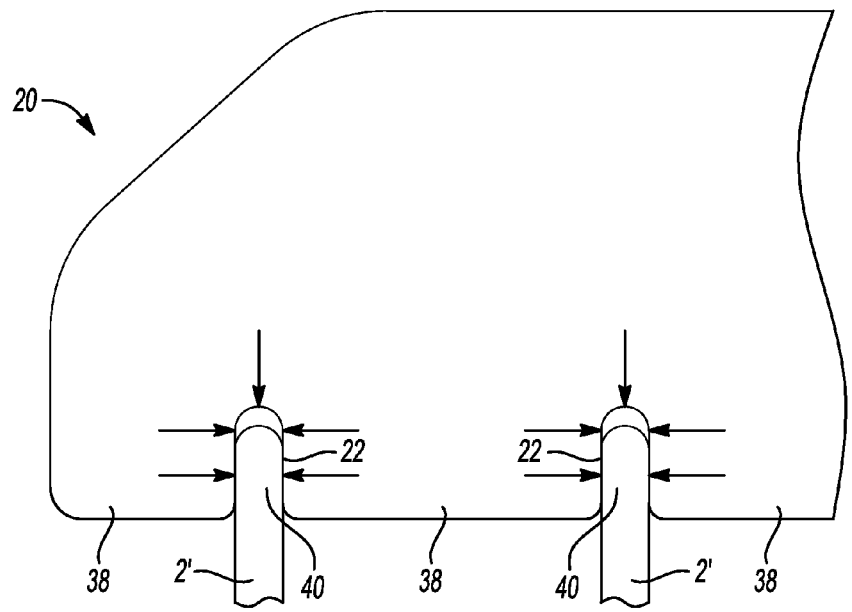
Figure 6D:
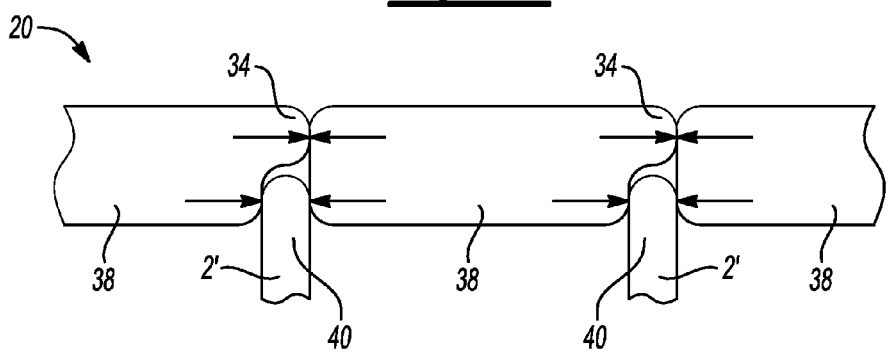

With reference to FIGS. 6A-6D, in a fourth example of the present disclosure, the one or more airbags 20 may comprise overlapping portions 34 that overlap with one another when the airbag is deflated. FIGS. 6A and 6B show side and bottom views respectively of the airbag in the unfolded (substantially flat) but pre-inflated state, whereas FIGS. 6C and 6D show side and bottom views respectively of the airbag 20 in the inflated state.

As depicted in FIGS. 6A and 6B, the overlapping portions 34 may overlap one another when the airbag is substantially flat but not yet inflated. The overlapping portions 34 are formed by airbag portions 38, which are wider (as measured along the lengthwise or fore-aft axis of the vehicle) at the bottom end of the airbag 20 so as to overlap one another. The airbag portions 38 may be separate airbags or they may be portions of the same airbag.

As shown in FIGS. 6C and 6D, the overlapping portions 34 may engage, e.g. clamp onto or around, either side of the seat back 2' when the airbag is inflated. It will be appreciated that the overlapping portions 34 may form the shaped portions 22 of the airbag. Furthermore, as for the third example, the engaging portion 40 may be a portion of the seat 2, e.g. a portion of the seat back 2'.

The overlapping portions 34 may be formed by slits 36 in or between one or more panels making up the airbag 20. One or more slits 36 may extend from a lower end of the airbag 20 (when the airbag is deployed). A plurality of slits 36 may be provided in a single airbag 20. Supplementary material 50 may form the overlaps that define the overlapping portions 34. The airbag 20 may be positioned in the vehicle such that the slits 36 line up with the seat backs 2' of two adjacent seating rows (a front/first row and a second row, for example) when the airbag is deployed.

When the overlapping portions 34 are inflated, the airbag 20 will want to occupy the space between the overlaps. This tendency serves to clamp the airbag 20 around the seat back 2' and thus hold the airbag 20 in place.

It will be appreciated by those skilled in the art that although the invention has been described by way of example with reference to one or more examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for a motor vehicle comprising:
    an inflatable curtain airbag having:
        an upper edge securable to a body of the motor vehicle to enable deployment of the airbag downwardly adjacent to a side wall of the vehicle; and
        a receiving portion adjacent a lower edge of the airbag and formed by a first and a second overlapping portion of the airbag which overlap one another when the airbag is deflated and form a clamping pocket upon inflation of the airbag; and a seat having an outboard portion disposed adjacent to the side wall and to the lower edge of the airbag when deployed such that the clamping pocket clamps onto the outboard portion of the seat the upon inflation.

2. The apparatus of claim 1, wherein the first and a second overlapping portion of the airbag are separated from one another by a slit extending upwardly from the lower edge.

3. A curtain airbag for a motor vehicle comprising:
an upper edge securable to the motor vehicle to enable deployment of the airbag downwardly between a side wall of the vehicle and a seat; and
a lower edge having a receiving portion adapted to clamp onto an outboard portion of a back of the seat upon airbag inflation.

4. The curtain airbag of claim 3, wherein the receiving portion is formed by a join connecting an inboard layer and an outboard layer of the airbag, the inboard layer having supplementary material adjacent to the join to form a clamping pocket configured to grip the outboard portion of the seat upon inflation of the airbag.

5. The curtain airbag of claim 4, further comprising a non-inflatable sail between forward and rear portions of the airbag adjacent to the join.

6. The curtain airbag of claim 4, wherein the join is a stitched seam.

7. The curtain airbag of claim 3, wherein the receiving portion is formed by a first and a second overlapping portion of the airbag which overlap one another when the airbag is deflated, the first and second overlapping portions forming a clamping pocket configured to grip the outboard portion of the seat upon inflation of the airbag.

8. The curtain airbag of claim 7, wherein the first and a second overlapping portion of the airbag are separated from one another by a slit extending upwardly from the lower edge.

9. A motor vehicle comprising:
a side wall having a lower sill and an upper sill defining a window opening;
a seat having a back adjacent to the lower sill; and
a curtain airbag having an upper edge mounted adjacent to the upper sill for deployment downward over the window opening, and having a lower portion adjacent to the lower sill when deployed and comprising a receiving portion adapted to clamp onto the seat back when inflated.

10. The motor vehicle of claim 9, wherein the receiving portion is formed by a join connecting an inboard layer and an outboard layer of the airbag, the inboard layer having supplementary material adjacent to the join to form a clamping pocket configured to grip the back of the seat upon inflation of the airbag.

11. The motor vehicle of claim 10, further comprising a non-inflatable sail between forward and rear portions of the airbag adjacent to the join.

12. The motor vehicle of claim 10, wherein the join is a stitched seam.

13. The motor vehicle of claim 9, wherein the receiving portion is formed by a first and a second overlapping portion of the airbag which overlap one another when the airbag is deflated, the overlapping portions forming a clamping pocket configured to grip the seat back upon inflation of the airbag.

14. The motor vehicle of claim 13, wherein the first and a second overlapping portion of the airbag are separated from one another by a slit extending upwardly from a lower edge of the lower portion.

* * * * *